US012058123B2

(12) United States Patent
S Bykampadi et al.

(10) Patent No.: US 12,058,123 B2
(45) Date of Patent: Aug. 6, 2024

(54) APPARATUSES AND METHODS RELATING TO AUTHORIZATION OF NETWORK FUNCTIONS

(71) Applicant: Nokia Technologies Oy, Espoo (FI)

(72) Inventors: Nagendra S Bykampadi, Bangalore (IN); Laurent Thiebaut, Antony (FR); Bruno Landais, Pleumeur-Bodou (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 387 days.

(21) Appl. No.: 17/621,477

(22) PCT Filed: Jun. 22, 2020

(86) PCT No.: PCT/EP2020/067314
§ 371 (c)(1),
(2) Date: Dec. 21, 2021

(87) PCT Pub. No.: WO2020/260187
PCT Pub. Date: Dec. 30, 2020

(65) Prior Publication Data
US 2022/0353255 A1 Nov. 3, 2022

(30) Foreign Application Priority Data
Jun. 24, 2019 (IN) .............................. 201941025067

(51) Int. Cl.
*H04L 9/40* (2022.01)
*G06F 21/44* (2013.01)
(Continued)

(52) U.S. Cl.
CPC ............ *H04L 63/083* (2013.01); *G06F 21/44* (2013.01); *H04L 63/0815* (2013.01);
(Continued)

(58) Field of Classification Search
None
See application file for complete search history.

(56) References Cited

U.S. PATENT DOCUMENTS 10,033,620 B1 * 7/2018 Sledz ...................... H04L 43/18
10,142,195 B1 * 11/2018 Sledz ..................... G06F 16/182
(Continued)

FOREIGN PATENT DOCUMENTS

| CN | 109862525 A | * | 6/2019 | ......... H04L 65/1063 |
| CN | 110476448 A | * | 11/2019 | |
| WO | WO-2019219251 A1 | * | 11/2019 | ............ H04W 24/04 |

OTHER PUBLICATIONS

"3rd Generation Partnership Project; Technical Specification Group Services and System Aspects; Security architecture and procedures for 5G system (Release 15)", 3GPP TS 33.501, V15.5.0, Jun. 2019, pp. 1-190.
(Continued)

*Primary Examiner* — Eleni A Shiferaw
*Assistant Examiner* — Ali H. Cheema
(74) *Attorney, Agent, or Firm* — Robert P. Michal, Esq.; Carter, DeLuca & Farrell LLP

(57) ABSTRACT

An apparatus relating to authorization of network functions includes at least one processor and at least one memory including computer program code. The at least one memory and the computer program code configured to, with the at least one processor, cause the apparatus to: send, from a first network function service consumer instance to an authorization server, a request for an access token for use in accessing a service provided by a network function service producer; receive, at the first network function service consumer instance from the authorization server, an access token for use in accessing the service provided by the network function service producer; and send, from the first network function service consumer instance to the network
(Continued)

function service producer, a request to access the service provided by the network function service producer, the request to access the service including the access token.

1 Claim, 6 Drawing Sheets

(51) Int. Cl.
    *H04W 12/08*     (2021.01)
    *H04W 12/084*     (2021.01)
    *H04W 12/10*     (2021.01)

(52) U.S. Cl.
    CPC .......... *H04L 63/0853* (2013.01); *H04L 63/10* (2013.01); *H04L 63/20* (2013.01); *H04W 12/08* (2013.01); *H04W 12/084* (2021.01); *H04W 12/10* (2013.01)

(56) References Cited

U.S. PATENT DOCUMENTS

| | | | | |
|---|---|---|---|---|
| 10,334,885 | B2 * | 7/2019 | Baker | A24F 40/50 |
| 2013/0074167 | A1 * | 3/2013 | Bailey | G06F 21/41 |
| | | | | 726/8 |
| 2014/0365526 | A1 * | 12/2014 | Sato | A63F 13/00 |
| | | | | 707/784 |
| 2015/0249660 | A1 * | 9/2015 | Bailey | G06F 21/30 |
| | | | | 726/8 |
| 2015/0350186 | A1 | 12/2015 | Chan et al. | |
| 2017/0013073 | A1 * | 1/2017 | Mendez | H04L 67/141 |
| 2017/0111247 | A1 * | 4/2017 | Uchiyama | G06F 3/1229 |
| 2017/0180347 | A1 * | 6/2017 | Koved | H04L 63/083 |
| 2017/0310675 | A1 * | 10/2017 | Kodama | G06F 21/41 |
| 2017/0337355 | A1 * | 11/2017 | Biswas | G06F 21/6209 |
| 2018/0278603 | A1 * | 9/2018 | Yabe | H04L 63/08 |
| 2019/0020655 | A1 * | 1/2019 | Asai | H04W 12/06 |
| 2019/0387401 | A1 * | 12/2019 | Liao | H04W 8/08 |
| 2020/0275255 | A1 * | 8/2020 | Wang | H04W 8/20 |
| 2020/0305001 | A1 * | 9/2020 | Li | H04W 12/102 |
| 2020/0344576 | A1 * | 10/2020 | Li | H04W 48/18 |
| 2021/0058771 | A1 * | 2/2021 | Wu | H04L 9/0861 |
| 2022/0052989 | A1 * | 2/2022 | Zhao | H04L 63/08 |
| 2022/0095111 | A1 * | 3/2022 | Fu | H04L 63/0853 |

OTHER PUBLICATIONS

"3rd Generation Partnership Project; Technical Specification Group Services and System Aspects; System Architecture for the 5G System; Stage 2 (Release 16)", 3GPP TS 23.501, V16.1.0, Jun. 2019, pp. 1-368.

"3rd Generation Partnership Project; Technical Specification Group Core Network and Terminals; 5G System; Network Function Repository Services; Stage 3 (Release 16)", 3GPP TS 29.510, V16.0.0, Jun. 2019, pp. 1-135.

International Search Report and Written Opinion received for corresponding Patent Cooperation Treaty Application No. PCT/EP2020/067314, dated Aug. 3, 2020, 14 pages.

"Editor's Note on per UE subscription level authorization in NRF", 3GPP TSG SA3 Meeting #91, S3-181385, Nokia, Apr. 16-20, 2018, 8 pages.

Office action received for corresponding Indian Patent Application No. 201941025067, dated Sep. 13, 2023, 7 pages.

* cited by examiner

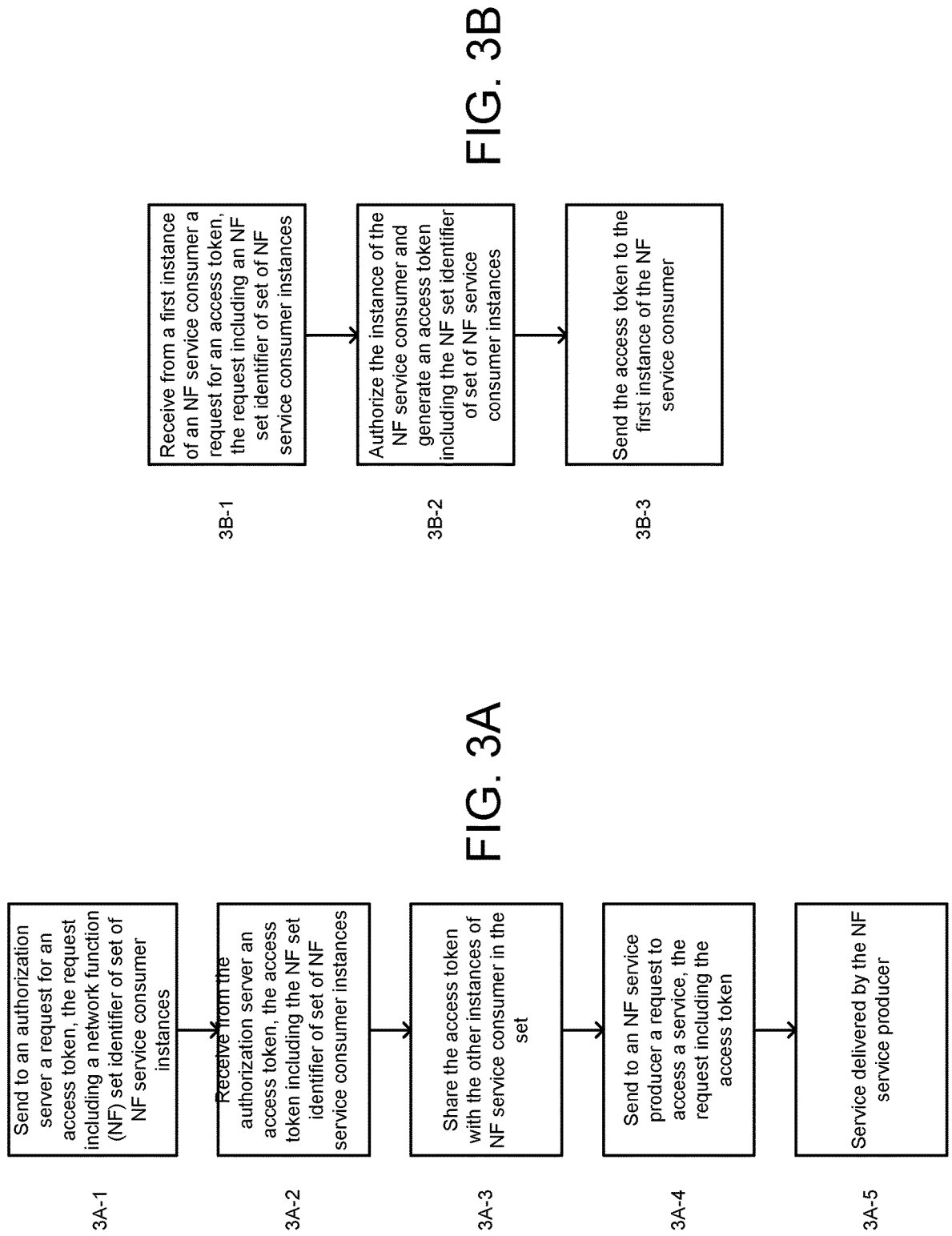

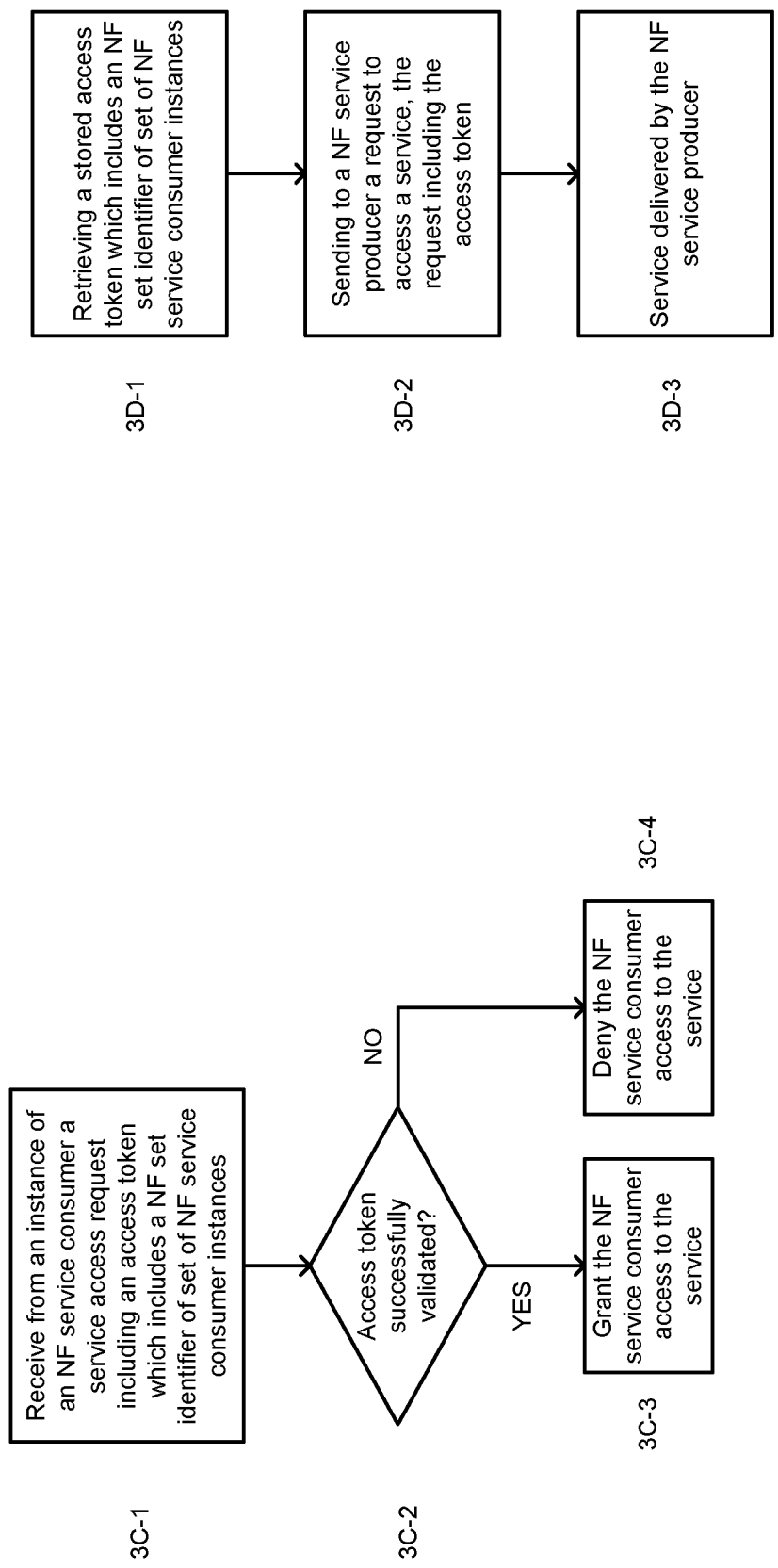

APPARATUSES AND METHODS RELATING TO AUTHORIZATION OF NETWORK FUNCTIONS

RELATED APPLICATION

This application claims priority to PCT Application No. PCT/EP2020/067314, filed on Jun. 22, 2020, which claims priority to Indian Application No. 201941025067 filed on Jun. 24, 2019, each of which is incorporated herein by reference in its entirety.

TECHNICAL FIELD

This specification relates to authorization of network functions, and more specifically to authorization of network functions within a set of network functions to access a service.

BACKGROUND

Certain modern telecommunications networks (such as 5G telecommunications networks) make use of sets of network functions, for instance, to improve network reliability, and to facilitate load (re) balancing and network scaling. For example, in 3GPP Release 16, the concepts of network function (NF) sets and NF service sets are introduced (see, for instance, 3GPP TS 23.501 "System architecture for the 5G System (5G5)", e.g. section 5.21.3).

SUMMARY

In a first aspect, this specification describes a method comprising: sending, from a first network function service consumer instance to an authorization server, a request for an access token for use in accessing a service provided by a network function service producer, wherein the request includes an identifier of a set of network function service consumer instances of which the first network function service consumer instance is a member; receiving, at the first network function service consumer instance from the authorization server, an access token for use in accessing the service provided by the network function service producer, wherein the access token includes the identifier of the set of network function service consumer instances of which the first network function service consumer instance is a member; sending, from the first network function service consumer instance to the network function service producer, a request to access the service provided by the network function service producer, wherein the request to access the service includes the access token.

The request to access the service provided by the network function service producer may include, in addition to the access token, the identifier of the set of network function service consumer instances of which the first network function service consumer instance is a member.

The method may further comprise sharing, by the first network function service consumer instance, the access token with the other network function service consumer instances of the set of network function service consumer instances of which the first network function service consumer instance is a member. The access token may be shared with the other network function service consumer instances of the set using an unstructured data storage function.

The method may further comprise accessing the service provided by the network function service producer.

In a second aspect, this specification describes a method comprising: receiving, from a network function service consumer instance at a network function service producer, a request to access a service provided by the network function service producer, wherein the request to access the service includes an access token for use in determining whether to grant to the network function service consumer instance access to the service, wherein the access token includes an identifier of a set of network function service consumer instances; determining whether the identifier of the set of network function service consumer instances included in the access token corresponds with an identifier of a set of network function service consumer instances of which the network function service consumer instance is a member; in response to determining that the identifier of the set of network function service consumer instances included in the access token corresponds with the identifier of the set of network function service consumer instances of which the network function service consumer instance is a member, granting the network function service consumer instance access to the service.

The identifier of the set of network function service consumer instances of which the network function service consumer instance is a member may be included in the request to access the service in addition to the access token.

The identifier of the set of network function service consumer instances of which the network function service consumer is a member may be included in information which was available to the network function service producer prior to receipt of the request to access the service. The information may be previously provided by the network function service consumer instance as part of an establishment of a connection between the network function service consumer instance and the network function service producer.

The method may further comprise in response to determining that the identifier of the set of network function service consumer instances included in the access token does not correspond with the identifier of the set of network function service consumer instances of which the network function service consumer instance is a member, denying the network function service consumer instance access to the service.

In a third aspect, this specification describes a method comprising: retrieving, by a network function service consumer instance, a access token granted by an authorization server to another network function service consumer instance of the same the set of network function service consumer instances, the access token being for use in accessing a service provided by a network function service producer, wherein the access token includes the identifier of the set of network function service consumer instances of which the network function service consumer instance is a member; sending, from the network function service consumer instance to the network function service producer, a request to access the service provided by the network function service producer, wherein the request to access the service includes the access token.

The access token may include an identifier of the other network function service consumer instance. The request to access the service provided by the network function service producer may include, in addition to the access token, the identifier of the set of network function service consumer instances of which the network function service consumer instance is a member.

In a fourth aspect, this specification describes a method comprising: receiving, from a first network function service consumer instance at an authorization server, a request for an access token for use in accessing a service provided by a network function service producer, wherein the request includes an identifier of a set of network function service consumer instances of which the first network function service consumer instance is a member; and providing, by the authorization server to the first network function service consumer instance, an access token for use in accessing the service provided by the network function service producer, wherein the access token includes the identifier of the set of network function service consumer instances of which the first network function service consumer instance is a member.

This specification also describes apparatus comprising means for performing a method according to any one of the first to fourth aspects. The apparatus may form at least part of a telecommunications network function.

This specification also describes apparatus comprising one or more processors and one or more non-transitory memory media having computer-readable instructions stored thereon which, when executed by the one or more processors cause performance of a method according to any one of the first to fourth aspects.

This specification also describes computer-readable instructions, optionally stored on a non-transitory computer-readable memory medium, which, when executed by computing apparatus, causes performance of a method according to any one of the first to fourth aspects.

BRIEF DESCRIPTION OF DRAWINGS

For better understanding of the present application, reference will now be made by way of example to the accompanying figures in which:

FIG. 3A illustrates example operations which may be performed by a first instance of a network function service consumer;

FIG. 3B illustrates example operations which may be performed by an authorization server; FIG. 3C illustrates example operations which may be performed by a network function service producer;

FIG. 3D illustrates example operations which may be performed by a second instance of the network function service consumer;

DETAILED DESCRIPTION

Figure 1:
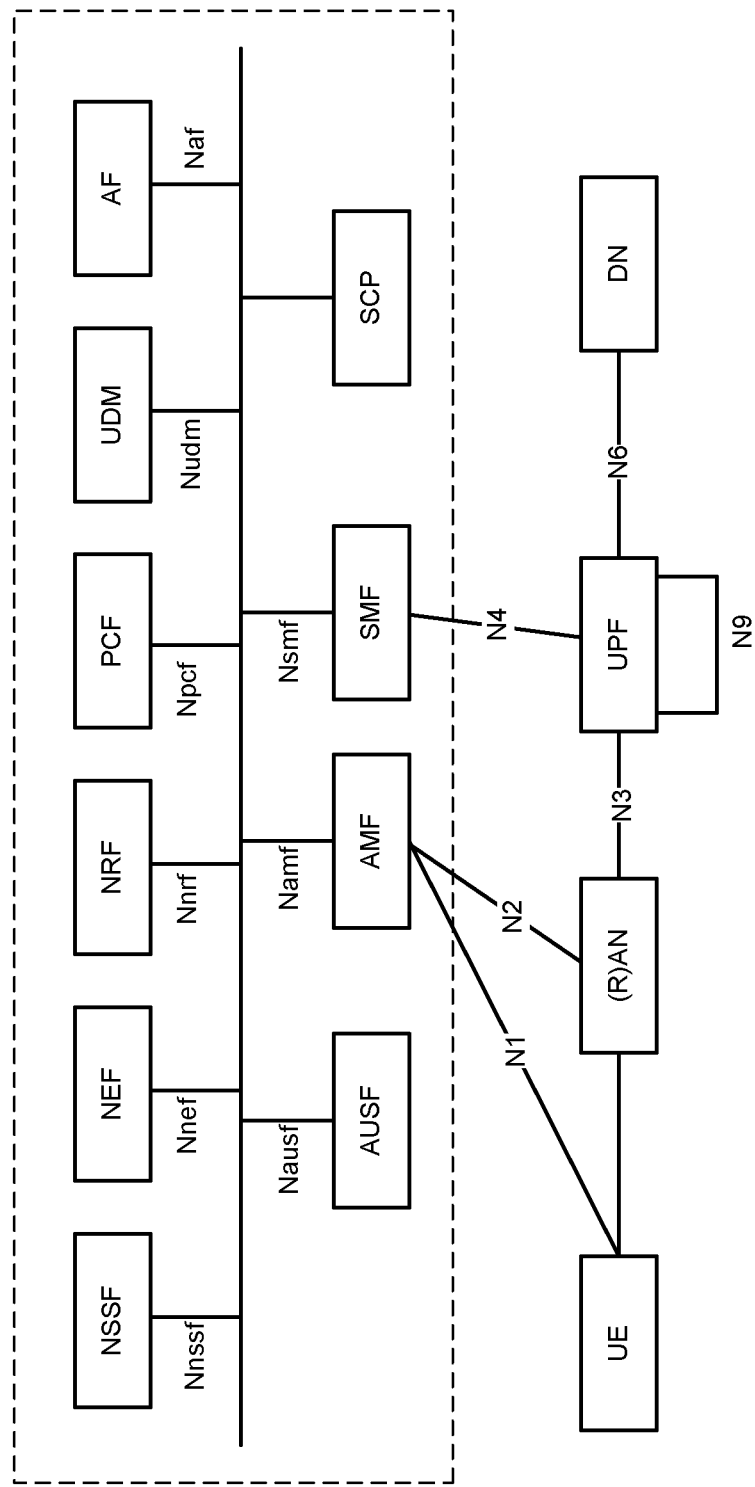
FIG. 1 is an example of a telecommunications network system architecture in which the example methods and apparatuses described herein may be implemented.

In the description and figures, like reference numerals refer to like elements throughout.

FIG. 1 is an example of a telecommunications network system architecture. Specifically, FIG. 1 depicts a non-roaming reference architecture of a 5G system. Although the subject technology will be described within this context, it will be appreciated that it is not limited to such a context. Instead, the technology may apply to any telecommunications networks which makes use of NF sets and which allows certain NFs (NF service consumers) to access services provided by other NFs (NF service producers). As will become apparent from the following discussion, the subject technology may serve to reduce the amount of messages that are exchanged between entities within such networks. More specifically, the subject technology may reduce the amount of messages that are required to be exchanged when different NF service consumers within a set of NFs each need to access a service provided by a particular NF service producer.

FIG. 1 depicts various NFs which may form a telecommunications network. These include:
- an Authentication Server Function (AUSF)
- an Access and Mobility Management Function (AMF)
- a Data Network (DN), e.g. operator services, Internet access or 3rd party services
- a Network Exposure Function (NEF)
- a Network Repository Function (NRF)
- a Network Slice Selection Function (NSSF)
- a Policy Control Function (PCF)
- a Session Management Function (SMF)
- a Unified Data Management (UDM)
- a User Plane Function (UPF)
- an Application Function (AF)
- a User Equipment (UE)
- a (Radio) Access Network ((R)AN)

FIG. 1 also depicts a Service Communication Proxy (SCP) which may be used for indirect communication between NFs and NF services, but does not expose services itself.

Other network functions which are not depicted in FIG. 1 but which may nonetheless be form part of the architecture include:
- an Unstructured Data Storage Function (UDSF)
- a Unified Data Repository (UDR)
- a UE radio Capability Management Function (UCMF)
- a 5G-Equipment Identity Register (5G-EIR)
- a Network Data Analytics Function (NWDAF)
- a Charging Function (CHF)

FIG. 1 also depicts various interfaces (e.g. Nnrf, Npcf, Ni, N2 etc.) between the various network functions. The above mentioned entities, network functions and network interfaces are discussed in more detail in 3GPP TS 23.501 "System architecture for the 5G System (5G5)", which is hereby incorporated by reference, as well as in preceding releases.

A network function (NF) set is a group of interchangeable NF instances of the same type. They may support the same services and the same Network Slice(s). The NF instances in the same NF Set may be geographically distributed but have access to the same context data. The context data may be shared in any suitable way, for instance via an Unstructured Data Storage Function (UDSF).

As mentioned previously, certain NFs may provide services for other NFs. The NFs which provide services may be referred to as NF service producers and the NFs that access the services may be referred to as NF service consumers.

A network function instance may, at any one time, be a service consumer and/or a service producer. For instance, it may provide a first service for a first other network function instance and access a second service from a second other network function instance.

A set of NF instances (an NF set) may facilitate reliability of NF instances within the same NF Set. For example, when a selected NF service producer instance is not available, another NF service producer instance within the same NF Set can be selected to continue offering service to the NF service consumer. Similarly, different instances of an NF service consumer within a particular NF set may be utilised. The switch between instances of NF service consumers within a set may occur, for instance, because a first NF service consumer in the set is no longer available. In such situations, each time a different NF service consumer is utilised, it must request access to the service from the appropriate NF service producers.

An example of switching between NF service consumers in a set of NFs is switching between different Session Management Function (SMF) instances from an SMF Set, which may manage a single PDU session during the lifetime of the PDU session. While managing the PDU session, the different SMF instances may need to access services provided by certain other NFs (NF service producers), such as, but not limited to, a Policy Control Function (PCF) and/or a Charging Function (CHF).

Another example of switching between NF service consumers in a set of NFs is switching between different Session Management Function (AMF) instances from an AMF Set which may manage UE(s). The different AMF instances may need to access services provided by certain other NFs (NF service producers), such as, but not limited to, a Session Management Function (SMF), a Policy Control Function (PCF) and/or a Charging Function (CHF).

In fact, the mechanism described in this document may apply to any service based interface defined in the 5G core When an NF service consumer (e.g. an SMF) wants to access a service (e.g. a service provided by a PCF), it may be required to request an access token to access the service. Requests for access tokens may be received and handled by an authorization server. The authorization server may be implemented by another network function, for instance the Network Repository Function (NRF). The authorization may be based on the 0Auth2 authorization framework (see 3GPP TS 33.501 and 3GPP TS 29.510), in which the authorization server may be referred to as 0Auth2 authorization server.

In response to the request, the authorization server authorises the requesting NF service consumer and generates and returns an access token to the requesting NF service consumer. The requesting NF service consumer then includes the granted access token in the service request which is sent to the NF service producer. The NF service producer can then validate the token prior to providing access to the service.

Figure 2A:
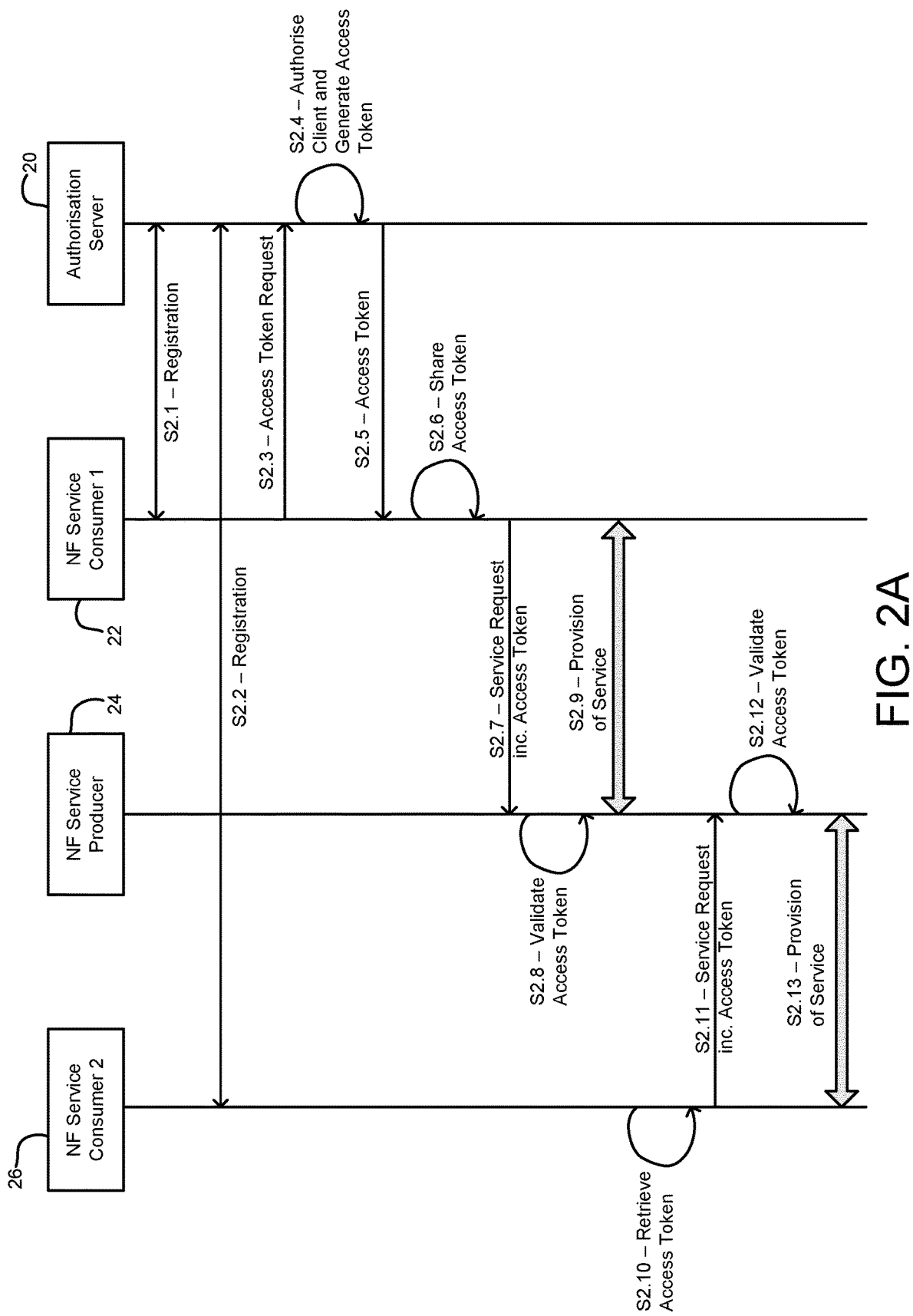
FIG. 2A is an example of a flow of operations in accordance present disclosure.

These operations are depicted in FIG. 2A which illustrates an operation flow in accordance with the subject technology disclosed herein. Specifically, FIG. 2A illustrates various operations which may be performed by entities within the system so as to enable different NF instances within a set of NF instances to access a particular service without each having to request an access token from the authorization server 20.

In operation S2.1, a first instance of an NF service consumer 22 in an NF set registers with the authorization server 20. In operation S2.2, a second instance of an NF service consumer 26 registers with the authorization server 20. The registrations of operations S2.1 and S2.2 maybe carried out in any suitable manner, for instance as described in 3GPP TS 33.501.

In operation S2.3, the first instance of the NF service consumer 22 sends to the authorization server, a request for an access token for use in accessing a service provided by an NF service producer 24. In the context of a 5G network, the access token request may be sent via the service-based interface exhibited by the NRF (referred to as Nnrf). The access token request may therefore be referred to as an"Nnrf_AccessToken_Get request". The access token request includes an identifier of the set of network function service consumers of which the first network function service consumer 22 is a member.

The access token request may additionally include one or any combination of the following information elements:
- an NF instance identifier of the requesting first instance of the NF service consumer 22;
- an indication of an NF type of the requesting first instance of the NF service consumer 22;
- an indication of an NF type of the NF service producer 24;
- an indication of the NF service name(s) of the NF service producer 24;
- an NF Instance identifier of the specific NF service producer 24 for which the access token is requested;
- a PLMN identifier of the requesting first instance of the NF service consumer 22; and
- a PLMN identifier of the NF service producer 24.

The access token request may, additionally or alternatively, include other information, which is not directly related with mechanism described in this document.

The access token request may be treated as a key, value pair data structure which is to be encoded using x-www-urlencoded format.

The table below provides more detail about which information elements may be present in the access token request, and under what circumstances. Apart from the "consumer-NFSetId", the access token request maybe as defined in FIG. 6.3.5.2.2 of 3GPP TS 29.510.

| Attribute name | P | Cardinality | Description |
|---|---|---|---|
| grant_type | M | 1 | This IE shall contain the grant type as "client_credentials" |
| nfInstanceId | M | 1 | This IE shall contain the NF instance id of the NF service consumer. |
| nfType | C | 0 . . . 1 | This IE shall be included when the access token request is for an NF type and not for a specific NF/NF service instance. When present, this IE shall contain the NF type of the NF service consumer. |
| targetNfType | C | 0 . . . 1 | This IE shall be included when the access token request is for an NF type and not for a specific NF/NF service instance. When present, this IE shall contain the NF type of the NF service producer. |

-continued

| Attribute name | P | Cardinality | Description |
|---|---|---|---|
| scope | M | 1 | This IE shall contain the NF service name(s) of the NF service producer(s). The service name(s) included in this attribute shall be any of the services defined in the ServiceName enumerated type. |
| targetNfInstanceId | C | 0 . . . 1 | This IE shall be included, if available and if it is an access token request for a specific NF Service Producer. When present this IE shall contain the NF Instance ID of the specific NF Service Producer for which the access token is requested. |
| requesterPlmn | C | 0 . . . 1 | This IE shall be included when the NF service consumer in one PLMN requests a service access authorisation for an NF service producer from a different PLMN. When present, this IE shall contain the PLMN ID of the requester NF service consumer. |
| targetPlmn | C | 0 . . . 1 | This IE shall be included when the NF service consumer in one PLMN requests a service access authorisation for an NF service producer from a different PLMN. When present, this IE shall contain the PLMN ID of the target PLMN (i.e., PLMN ID of the NF service producer). |
| consumerNFSetId | C | 0 . . . 1 | This IE shall be included when the NF service consumer belongs to a NF Set and requests access token that can be used by all NF service consumer instances within the NF Set. |

In operation S2.4, in response to the access token request, the authorization server 20 authorises the requesting first instance of the NF service consumer 22 and generates an access token. The generated access token includes the identifier of the set of network function service consumers of which the first instance of the NF service consumer 24 is a member.

The access token may additionally include one or any combination of the following information elements (or "claims"):
- an NF instance identifier of the access token issuer (i.e. the authorization server 20);
- an NF instance identifier of the requesting first instance of the NF service consumer 22;
- an indication of an NF type of the NF service producer 24 to which the access token is applicable
- an NF Instance identifier of the specific NF service producer 24 to which the access token relates;
- an indication of the NF service name(s) for which the access token is authorised for use;
- an indication of a duration for which the access token is a valid;
- a PLMN identifier of the requesting first instance of the NF service consumer 22; and
- a PLMN identifier of the NF service producer 24.

The access token may, additionally or alternatively, include other information, which is not directly related with mechanism described in this document.

In some examples, the authorization server 20 may encrypt the access token such that it can only be decrypted by the NF service producer 24. This may ensure that the contents of the access token are not visible to other entities such as the NF service consumers 22, 26. In such examples, the contents of the access token may be fully ciphered. In addition or alternatively, the access token may be integrity protected so as to ensure that the token is not tampered with. This may be performed, for instance by generating a Message authentication code (MAC) using standard mechanisms such as HMAC-SHAi or HMAC-SHA3. The NF service producer 24 may then use the necessary cryptographic material needed to verify the MAC value against the received token. If it is determined that the token has been tampered with, the NF service producer 24 acts accordingly, for instance by declining the service request.

The table below provides more detail about which information elements ("claims") maybe present in the access token, and under what circumstances. Apart from the "consumerNFSetId", the access token may be as defined in FIG. 6.3.5.2.4-1 of 3GPP TS 29.510.

| Attribute name | P | Cardinality | Description |
|---|---|---|---|
| iss | M | 1 | This IE shall contain NF instance id of the authorisation server (e.g. the NRF). |
| sub | M | 1 | This IE shall contain the NF instance ID of the NF service consumer. |
| aud | M | 1 | This IE shall contain the NF service producer's NF instance ID(s) (if the exact NF instance(s) of the NF service producer is known) or the NF type of NF service producers for which the claim is applicable. |

| Attribute name | P | Cardinality | Description |
| --- | --- | --- | --- |
| scope | M | 1 | This IE shall contain the name of the NF services for which the access_token is authorised for use |
| exp | M | 1 | This IE shall contain the number of seconds after which the access_token is considered to be expired. |
| consumerNFSetId | C | 0 . . . 1 | This IE shall be included by the authorisation server when an access token is generated for all NF consumers in the NF Set. |
| consumerPlmnId | C | 0 . . . 1 | This IE shall be included if the authorisation server supports providing PLMN ID of the NF service consumer in the access token. If an NF service producer that receives this IE in the token included in the authorisation header does not understand this IE, it shall be ignored. |
| producerPlmnId | C | 0 . . . 1 | This IE shall be included if the NRF supports providing PLMN ID of the NF service producer in the access token. If an NF service producer that receives this IE in the token included in the authorisation header does not understand this IE, it shall be ignored. |

In operation S2.5, the authorization server 20 may send the access token to the first instance of the NF service consumer 22. This may be sent via the Nnrf service-based interface.

In operation S2.6, the first instance of the NF service consumer 22 may share the received access token with the other instances in the set of which the first instance is a member. In this way, the other instances of the NF service consumer, including the second instance of the NF service consumer 26, can access and make use of the access token. The access token may be stored as context data, for instance, using an unstructured data storage function (UDSF), the context data being accessible to all instances of the NF service consumer in the set. As will be appreciated, the sharing of the access token is not limited to UDSF. Instead, the access token may be shared with the other NF consumer instances in the set in any suitable way, for instance via one or more messages passed between the NF consumer instances. In operation S2.7, the first instance of the NF service consumer 22 sends to the network function service producer 24 a request to access the service provided by the network function service producer 24. This request may be referred to as a service request. The service request includes the access token. In some examples, the service request may include, in addition to the access token, the identifier of the set of network function service consumers of which the first instance of the NF service consumer 22 is a member. In addition or alternatively, the service request may include the identifier of the instance of the NF service consumer 22, which sends the service request.

It will therefore be appreciated that, in some examples, the request to access the service may include two network function set identifiers: one in the request and another in the access token that is included in the request. The set identifier in the request is the set identifier of the network function consumer instance that is requesting access to the service and the set identifier in the access token is the set identifier of the network function consumer instance that originally requested the access token from the authorization server 20.

In operation S2.8, the NF service producer 24 validates the received access token. This may include determining whether the identifier of the set of network function service consumers (the NF set identifier) included in the access token corresponds with or matches an identifier of a set of network function service consumers of which the first instance of the NF service consumer is a member. When the service request includes the NF set identifier for the first instance of the NF service consumer 24, operation S2.8 may comprise comparing this identifier with the NF set identifier which is present in the access token. In some examples, the NF service producer 24 may have previously received the NF set identifier for the first instance of the NF service consumer 22. In such examples, validation may comprise the NF service producer 24 determining whether the previously-received NF set identifier corresponds with or matches the NF set identifier which is present in the access token. This may occur for instance when the NF service consumer 22 and the NF service producer 24 have previously established a connection e.g. a mutually authenticated TLS connection such as may be used in intra-PLMN scenarios. In such examples, the NF set identifier which is compared to that in the access token maybe present in the subject name in the client certificate, which was provided during establishment of the TLS connection.

As will be appreciated, validation of the access token may additionally consider other information elements which are included in the access token. For instance, it may include determining, based on the duration for which the access token is valid, that the access token has not expired. Also, it may include determining based on information included in the access token (e.g. the NF Instance identifier of the specific NF service producer 24 to which the access token relates and/or the NF service name(s) for which the access token is authorised for use) that the access token authorises access to a service that is provided by the NF service producer 24.

Although not shown in FIG. 2A, in examples in which the access token is encrypted, the NF service producer 24 may decrypt the access token before its validation. Similarly, the NF service producer 24 may perform an integrity check as part of its validation.

In response to determining that the NF set identifier associated with the requesting instance of the NF service consumer 22 corresponds with the NF set identifier included in the access token, the NF service producer 24 may provide the requested service to the requesting instance of the NF service consumer 22. This is shown in operation S2.9 of FIG. 2A.

Although not illustrated in FIG. 2A, the NF service producer 24 may respond to determining that the NF set identifier included in the access token does not correspond with the NF set identifier for the first instance of the NF service consumer 22 by denying the first instance of the NF service consumer 22 access to the requested service. Access to the requested service may also be denied, for instance, when the information in the access token indicates that the access token has expired.

At some later point, circumstances may arise in which a second instance of the NF service consumer 26 needs to access the service provided by the service producer 24. As discussed previously, this may occur when the first instance of the NF service consumer 22 becomes unavailable or overloaded. For example, during scaling out procedures, another NF instance is created by network OAM (Operation, Administration and Maintenance) within the set in order to share the load of the already deployed NF instances that are overloaded. In that case the newly created NF instance gets the token from the already deployed NF instances. An instance of a NF may become unavailable e.g. due to a SW or HW issue or due to scaling in which the instance is removed by OAM in order to allocate the corresponding CPU
(computer resource) to another task In such circumstances, the second instance of the NF service consumer 26 may, in operation S2.10, retrieve the access token that was shared in operation S2.6. The retrieval may, for instance, be performed using the unstructured data storage function (UDSF).

In operation S2.11, the second instance of the NF service consumer 26 may send a request for the service to the NF service producer 24. Similarly to the request sent by the first instance of the NF service consumer 22 in operation S2.7, the service request includes the access token. The service request may additionally include the NF set identifier for the second instance of the NF service consumer 26. In addition or alternatively, the service request may include the identifier of the instance of the NF service consumer 26, which sends the service request.

In operation S2.12, the NF service producer 24 validates the received access token. This may be similar to operation S2.8. As such, it may include determining whether the NF set identifier included in the access token corresponds with or matches an identifier of the set of network function service consumers of which the second instance of the NF service consumer is a member. Since the first and second instances of the NF service consumer 22, 26 are members of the same NF set, the NF set identifier for the second instance of the NF service consumer 26 is the same as the NF set identifier for the first instance of the NF service consumer 22. As such, the NF set identifier for the second instance of the NF service will match the NF set identifier that was included in the access token that was originally issued to the first instance of the NF service consumer 22.

As described with reference to operation S2.8, validation may additionally comprise consideration of other information elements included in the access token (such as but not limited to the indication of the duration for which the access token is valid, the NF Instance identifier of the specific NF service producer 24 to which the access token relates and/or the NF service name(s)).

If the access token is not successfully validated, access to the service is denied. However, if the access token is successfully validated, the service is provided to the second instance of the NF service consumer 26 as illustrated in operation S2.13.

Although not shown in FIG. 2A, the NF service producer 24 may decrypt and/or perform integrity checking of the access token prior to validation.

As will be understood from the above discussion, FIG. 2A therefore illustrates an approach by which multiple different instances of an NF service consumer within a particular NF set can access a service provided by a particular service producer without each having to request and receive an access token from the authorization server 20. Thus, the approach may reduce traffic in the network and also the processing that is required to be performed by the authorization server.

Figure 2B:
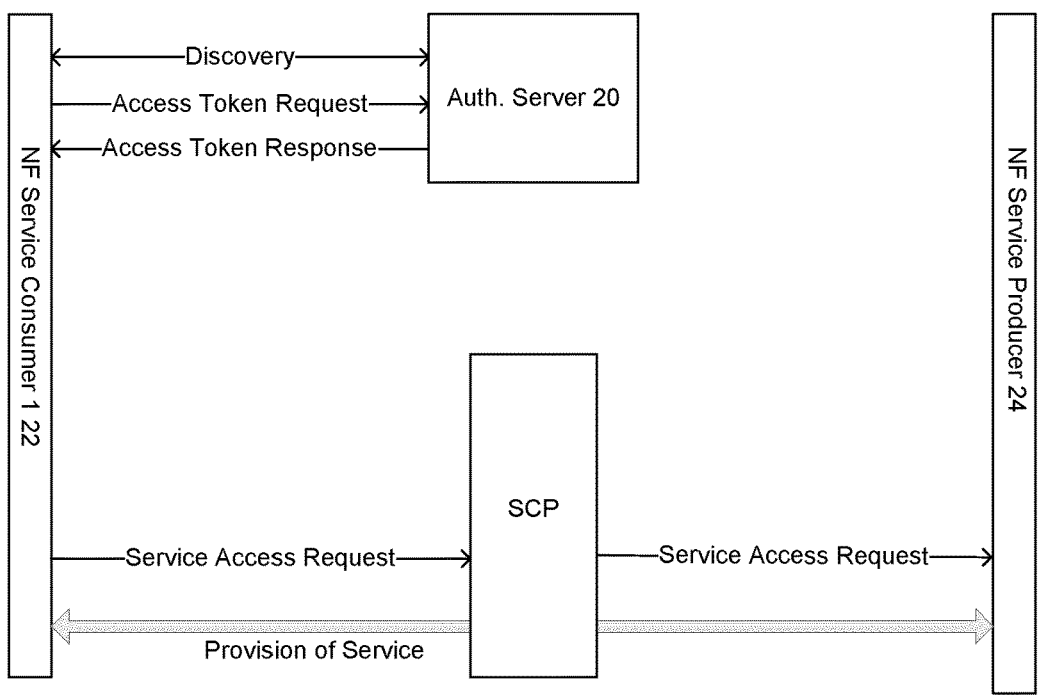
FIGS. 2B and 2C are examples of alternative routes via which the communications/messages described with reference FIG. 2A may travel.
Figure 2C:
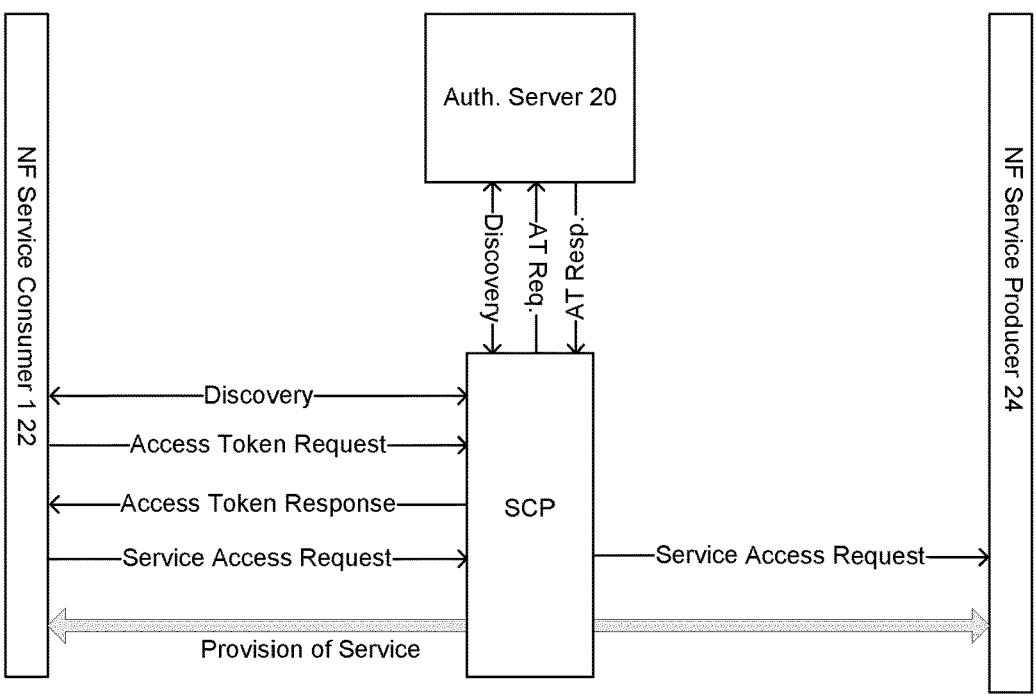

Although not shown in FIG. 2A, in some examples, various communications between the network functions may be routed via a Service Communication Proxy (SCP). Two such examples are illustrated in FIGS. 2B and 2C. For instance, as illustrated in FIG. 2B, the NF service consumer instances 22, 26 may communicate with the NF service producer 24 instance via the SCP, but the NF service consumer instances 22, 26 may communicate with the authentication server 20 (e.g. the NRF) directly (i.e. not via the SCP). In FIG. 2C, on other hand, all communications are routed via the SCP.

FIGS. 3A to 3D are flow charts illustrating operations which may be performed by the various entities depicted in FIGS. 2A to 2C.

FIG. 3A illustrates operations which may be performed by the first instance of the NF service consumer 22.

In operation 3A-1, the first instance of the NF service consumer 22 sends a request for an access token to an authorization server. The request includes a network function (NF) set identifier of the set of which the first instance is a member. Operation 3A-1 may be as described with reference to operation S2.3 of FIG. 2A.

In operation 3A-2, the first instance of the NF service consumer 22 receives from the authorization server an access token, the access token including the NF set identifier that was provided in the request. Access token and its receipt may be substantially as described with reference to operation S2.5 of FIG. 2A.

In operation 3A-3, the first instance of the NF service consumer 22 shares the access token with the other instances of NF service consumer in the set. This maybe performed as described with reference to operation S2.6 of FIG. 2A. In operation 3A-4, the first instance of the NF service consumer 22 sends a request to access the service to the NF service producer 24. The request includes the access token.

Operation 3A-4 may be as described with reference to operation S2.7 of FIG. 2A.

In operation 3A-5, the NF service producer 24 delivers the service to the first instance of the NF service consumer 22. This is subject to the NF service producer 24 validating the access token. Operation 3A-5 maybe as described with reference to operation S2.9 of FIG. 2A.

FIG. 3B illustrates operations which may be performed by the authorization server 20.

In operation 3B-1, the authorization server 20 receives from a first instance of an NF service consumer 22 a request for an access token for use in accessing a service provided by an NF service producer 24. The request includes an NF set identifier. The request may be substantially as described with reference to operation S2.3. In operation 3B-2, the authorization server 20 authorises the first instance of the NF service consumer 22. It then generates an access token including the NF set identifier.

Operation 3B-2, and the access token, may be as described with reference to operation S2.4 of FIG. 2A.

In operation 3B-3, the authorization server 20 sends the access token to the first instance of the NF service consumer 22. This may be as described with reference to operation S2.5 of FIG. 2A.

FIG. 3C illustrates operations which may be performed by the NF service producer 24.

In operation 3C-1, the NF service producer 24 receives from an instance of an NF service consumer 22, 26 a request to access a service. The request may be received from an instance of an NF service consumer 22 which requested and received the access token or from an instance of an NF service consumer 26 with which the access token was shared. The request to access the service includes an access token which includes a NF set identifier. The request to access the service may be as described with reference to either of operations S2.7 and S2.11 of FIG. 2A.

In operation 3C-2, the NF service producer 24 validates the access token. This comprises determining whether the NF set identifier corresponds with the NF set identifier of the instance of the NF service consumer 22, 26 from which the request is received. Validation of the access token and determination of whether the NF set identifier corresponds with set identifier of the instance of the NF service consumer 22, 26 may be as described with reference to either of operations S2.8 and S2.12 of FIG. 2A.

In response to the access token being successfully validated, the NF service producer 24, in operation 3C-3, grants the requesting instance of the NF service consumer 22, 26 access to the service. This maybe as described with reference to either of operations S2.9 and S2.12 in FIG. 3.

In response to the access token not being successfully validated, the NF service producer 24, in operation 3C-4, denies the requesting instance of the NF service consumer 22, 26 access to the service. This maybe as described with reference to either of operations S2.9 and S2.12 in FIG. 3.

FIG. 3D illustrates operations which may be performed by the second instance of the NF service consumer 26.

In operation 3D-1, the second instance of the NF service consumer 26 retrieves a stored access token which includes an NF set identifier. This may be as described in operation S2-10 of FIG. 2A. It may be performed in response to the second instance of the NF service consumer 26 determining that it needs to access the service.

In operation 3D-2, the second instance of the NF service consumer 26 sends a request to access a service to an NF service producer 24. The request includes the retrieved access token. Operation 3D-2 maybe as described with reference to operation S2.11 of FIG. 2A.

In operation 3D-3, the NF service producer 24 delivers the service to the second instance of the NF service consumer 26. This is subject to the NF service producer 24 validating the access token. Operation 3D-3 may be as described with reference to operation S2.13 of FIG. 2A.

As will of course be appreciated, the different functions and operations described herein with reference to FIGS. 2A to 3D maybe performed in a different order and/or concurrently with each other. Furthermore, if appropriate, one or more of the above-described functions may be optional or may be combined. For instance, operations S2.6 and S2.7 (and similarly 3A-3 and 3A-4/3A-5) maybe differently ordered and/or performed concurrently.

Figure 4A:
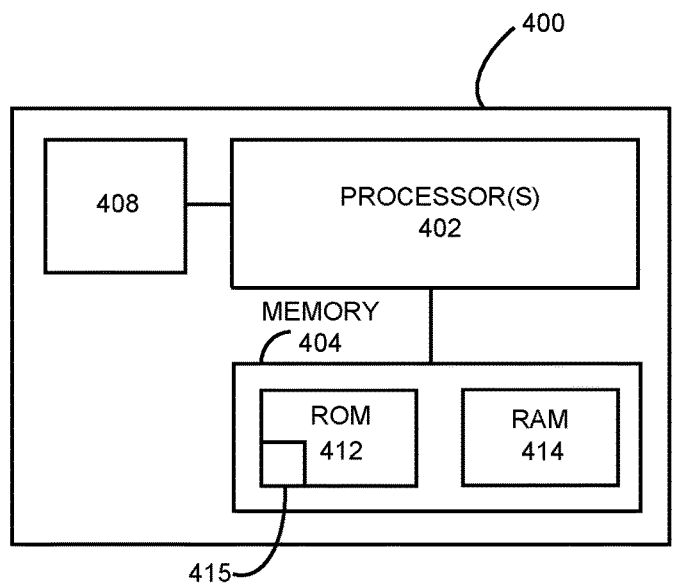
FIG. 4A is a schematic of a processing system by which the methods and operations described herein may be performed.

For completeness, FIG. 4A is a schematic diagram of components of one or more of the network functions and entities described previously, which hereafter are referred to generically as processing systems 400. A processing system 400 may have one or more processors 402, a memory 404 closely coupled to the processor(s) and comprised of a RAM 414 and ROM 412. The processing system 400 may comprise one or more network/apparatus interfaces 408 for connection with other entities/functions within the network.

The processor(s) 402 is connected to each of the other components in order to control operation thereof.

The memory 404 may comprise a non-volatile memory, such as a hard disk drive (HDD) or a solid-state drive (SSD). The ROM 412 of the memory 404 may store computer-readable instructions, such as but not limited to an operating system 415 and/or one or more software applications 416. The RAM 414 of the memory 404 is used by the processor 402 for the temporary storage of data. The computer-readable instructions, when executed by the one or more processor may implement aspects of the methods or operation flows described above with reference to FIGS. 2A to 3D.

The processor(s) 402 may take any suitable form. For instance, it may be a microcontroller, a plurality of microcontrollers, a processor, or a plurality of processors.

The processing system 400 may be a standalone computer, a server, a console, or a network thereof.

Figure 4B:
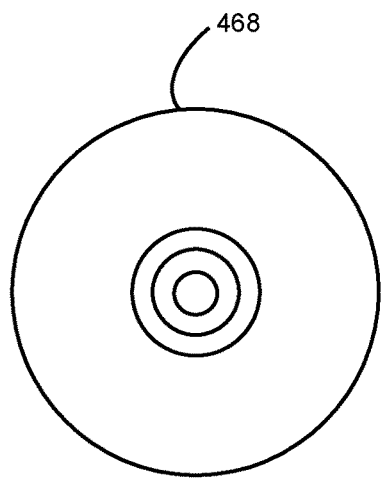
FIGS. 4B and 4C are examples of non-transitory memory media.
Figure 4C:
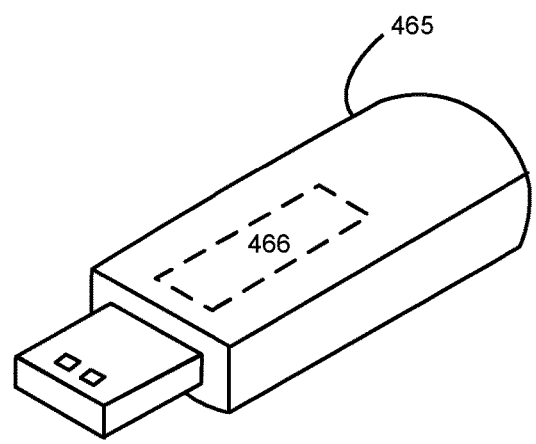

FIGS. 4B and 4C show tangible media, respectively a compact disc (CD) 468 and a removable memory unit 465 storing computer-readable code which when run by a computer may perform methods such as those described as examples above. The removable memory unit 465 maybe a memory stick, e.g. a USB memory stick, having internal memory 466 storing the computer-readable code. The memory 466 may be accessed by a computer system via a connector 467. The CD 468 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or"computer-readable medium" maybe any non-transitory media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

As used in this application, the term "circuitry" refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a server, to perform various functions) and (c) to circuits, such as a microprocessor(s) or a portion of a microprocessor(s), that require software or firmware for operation, even if the software or firmware is not physically present.

It will be appreciated that the above described examples are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

We claim:

1. An apparatus comprising at least one processor; and at least one memory including computer program code; the at least one memory and the computer program code configured to, with the at least one processor, cause the apparatus at least to:
send, from a first network function service consumer instance of a fifth-generation technology standard for cellular networks (5G) system to an authorization server, a request for an access token for use in accessing a service provided by a network function service producer of a 5G system, wherein the request includes an identifier of a set of network function service consumer instances of which the first network function service consumer instance is a member, wherein the first network function service consumer instance is an access and mobility management function (AMF) instance;
receive, at the first network function service consumer instance from the authorization server, an access token in an encrypted form for use in accessing the service provided by the network function service producer, wherein the access token includes the identifier of the set of network function service consumer instances of which the first network function service consumer instance is the member, wherein the network function service producer decrypts and performs integrity checking of the access token prior to validation of the access token;
send, from the first network function service consumer instance to the network function service producer, a request to access the service provided by the network function service producer, wherein the request to access the service includes the access token, wherein the request to access the service provided by the network function service producer includes, in addition to the access token, the identifier of the set of network function service consumer instances of which the first network function service consumer instance is the member;
access the service provided by the network function service producer; and
share, by the first network function service consumer instance, the access token with other network function service consumer instances of the set of network function service consumer instances of which the first network function service consumer instance is the member,
wherein the access token is shared with the other network function service consumer instances of the set of network function service consumer instances by using an unstructured data storage function,
wherein the access token includes:
a network function instance identifier of the requesting first instance of the network function service consumer;
an indication of a network function type of the requesting first instance of the network function service consumer;
an indication of a network function type of the network function service producer;
an indication of a network function service name of the network function service producer;
a network function Instance identifier of a specific network function service producer for which the access token is requested;
a public land mobile network (PLMN) identifier of the requesting first instance of the network function service consumer; and
a PLMN identifier of the network function service producer.

* * * * *